(12) United States Patent
Fields et al.

(10) Patent No.: US 11,926,327 B2
(45) Date of Patent: Mar. 12, 2024

(54) ALL-WHEEL DRIVE SYSTEM AND METHOD FOR OPERATING THE SAME

(71) Applicant: Polaris Industries Inc., Medina, MN (US)

(72) Inventors: Jason R Fields, Oak Grove, MN (US); Jeffrey M. Goulet, North Branch, MN (US)

(73) Assignee: Polaris Industries Inc., Medina, MN (US)

( * ) Notice: Subject to any disclaimer, the term of this patent is extended or adjusted under 35 U.S.C. 154(b) by 136 days.

(21) Appl. No.: 17/384,772

(22) Filed: Jul. 25, 2021

(65) Prior Publication Data
US 2022/0032912 A1 Feb. 3, 2022

Related U.S. Application Data

(60) Provisional application No. 63/058,571, filed on Jul. 30, 2020.

(51) Int. Cl.
*B60W 30/00* (2006.01)
*B60K 17/34* (2006.01)
*B60W 30/188* (2012.01)

(52) U.S. Cl.
CPC ........... *B60W 30/188* (2013.01); *B60K 17/34* (2013.01)

(58) Field of Classification Search
CPC ..... B60W 30/188; B60K 17/22; B60K 17/34; B60K 17/342; B60K 17/344; B60K 5/04; B60Y 2200/124; B60Y 2200/20; B60Y 2400/79
See application file for complete search history.

(56) References Cited

U.S. PATENT DOCUMENTS

| | | | | | |
|---|---|---|---|---|---|
| 4,063,609 | A | * | 12/1977 | Kincaid | F16H 48/12 180/251 |
| 5,431,603 | A | * | 7/1995 | Aho | B60K 17/351 475/91 |
| 5,704,443 | A | * | 1/1998 | Janiszewski | B60K 17/351 475/202 |
| 6,976,553 | B1 | * | 12/2005 | Dahl | B60K 23/08 180/247 |
| 7,018,317 | B2 | * | 3/2006 | Tweet | B60K 17/346 475/237 |

(Continued)

FOREIGN PATENT DOCUMENTS

WO WO-2015053792 A1 4/2015

OTHER PUBLICATIONS

International Search Report and Written Opinion regarding International Application No. PCT/US2021/043904, dated Sep. 29, 2021.

(Continued)

*Primary Examiner* — Phutthiwat Wongwian
*Assistant Examiner* — Sherman D Manley
(74) *Attorney, Agent, or Firm* — Harness, Dickey & Pierce, P.L.C.

(57) ABSTRACT

A drive system driving front wheels and rear wheels of a vehicle includes a powertrain comprising an output shaft, a rear driveshaft coupled to the rear wheels, a drive mechanism coupling the output shaft to the rear wheels, a front driveshaft shaft coupled to the front wheels and a prop shaft coupling the rear driveshaft and to the front driveshaft.

10 Claims, 4 Drawing Sheets

(56) References Cited

U.S. PATENT DOCUMENTS

| | | | | |
|---|---|---|---|---|
| 8,439,141 | B2* | 5/2013 | Bessho | F16H 57/0416 |
| | | | | 180/339 |
| 8,459,397 | B2* | 6/2013 | Bessho | B60K 17/08 |
| | | | | 474/166 |
| 9,182,012 | B2* | 11/2015 | Greiss | B60K 17/344 |
| 9,518,623 | B2* | 12/2016 | Mastie | F16D 27/118 |
| 10,179,506 | B2* | 1/2019 | Yagyu | B60W 10/18 |
| 10,442,264 | B2* | 10/2019 | Mailhot | B60G 7/008 |
| 10,479,422 | B2* | 11/2019 | Hollman | F16D 9/06 |
| 11,046,176 | B2* | 6/2021 | Danielson | F16H 57/035 |
| 11,293,540 | B2* | 4/2022 | Leclair | B60K 13/02 |
| 2001/0050188 | A1* | 12/2001 | Ima | B62D 61/10 |
| | | | | 180/22 |
| 2005/0224262 | A1* | 10/2005 | Ima | B60K 17/08 |
| | | | | 180/53.6 |
| 2009/0283350 | A1* | 11/2009 | Arnold | B60K 17/342 |
| | | | | 180/251 |
| 2012/0055729 | A1* | 3/2012 | Bessho | B60K 5/04 |
| | | | | 180/309 |
| 2016/0114680 | A1* | 4/2016 | Pritchard | F16H 57/0441 |
| | | | | 74/665 F |
| 2017/0174027 | A1* | 6/2017 | Mailhot | B60R 21/13 |
| 2018/0326843 | A1* | 11/2018 | Danielson | B60G 15/062 |
| 2019/0016216 | A1* | 1/2019 | Sundberg | B60K 17/36 |
| 2020/0215906 | A1* | 7/2020 | Shimazaki | B60K 23/08 |
| 2021/0046961 | A1* | 2/2021 | Whittemore | B61L 23/06 |

OTHER PUBLICATIONS

Indian Office Action dated Apr. 6, 2023 in corresponding Indian Application No. 202347009677 (5 pages).

* cited by examiner

ALL-WHEEL DRIVE SYSTEM AND METHOD FOR OPERATING THE SAME

CROSS-REFERENCE TO RELATED APPLICATION

This application claims the benefit of U.S. Provisional Application No. 63/058,571, filed on Jul. 30, 2020. The entire disclosure of the above application is incorporated herein by reference.

FIELD

The present disclosure relates to a drive system for a utility vehicle and, more particularly, to an all-wheel drive system for a utility vehicle.

BACKGROUND

This section provides background information related to the present disclosure which is not necessarily prior art.

Off-road utility vehicles are increasing in popularity. The market for such vehicles is very competitive. To keep costs low on base vehicles, the base vehicle is commonly offered with rear wheel drive. Adding all-wheel drive can increase the cost significantly depending on the driveline component chosen. There is a need to provide a low cost all-wheel drive alternative to expensive systems.

SUMMARY

This section provides a general summary of the disclosures, and is not a comprehensive disclosure of its full scope or all of its features.

An all-wheel drive system that is relatively low cost is set forth.

In one aspect of the disclosure, a drive system driving front wheels and rear wheels of a vehicle includes a powertrain comprising an output shaft, a rear driveshaft coupled to the rear wheels, a drive mechanism coupling the output shaft to the rear wheels, a front driveshaft shaft coupled to the front wheels and a prop shaft coupling the rear driveshaft and to the front driveshaft.

In another aspect of the disclosure a method driving front wheels and rear wheels of a vehicle includes rotating an output shaft of a powertrain, coupling the output shaft to a rear driveshaft through a drive mechanism, rotating the rear driveshaft and the rear wheels coupled thereto in response to rotating the output shaft, coupling a front driveshaft to the rear driveshaft through a prop shaft, and rotating the front driveshaft coupled to the front wheels.

Further areas of applicability will become apparent from the description provided herein. The description and specific examples in this summary are intended for purposes of illustration only and are not intended to limit the scope of the present disclosure.

DRAWINGS

DETAILED DESCRIPTION

Examples will now be described more fully with reference to the accompanying drawings. Although the following description includes several examples of a utility vehicle application, it is understood that the features herein may be applied to any appropriate vehicle, such as motorcycles, all-terrain vehicles, mopeds, scooters, etc. The examples disclosed below are not intended to be exhaustive or to limit the disclosure to the precise forms disclosed in the following detailed description. Rather, the examples are chosen and described so that others skilled in the art may utilize their teachings. The dimensions and relative directions are set forth are relative to the normal operating position of a vehicle on a level operating surface such as a road or ground. In operating the system will be used off road and certainly not on level ground.

Figure 1:
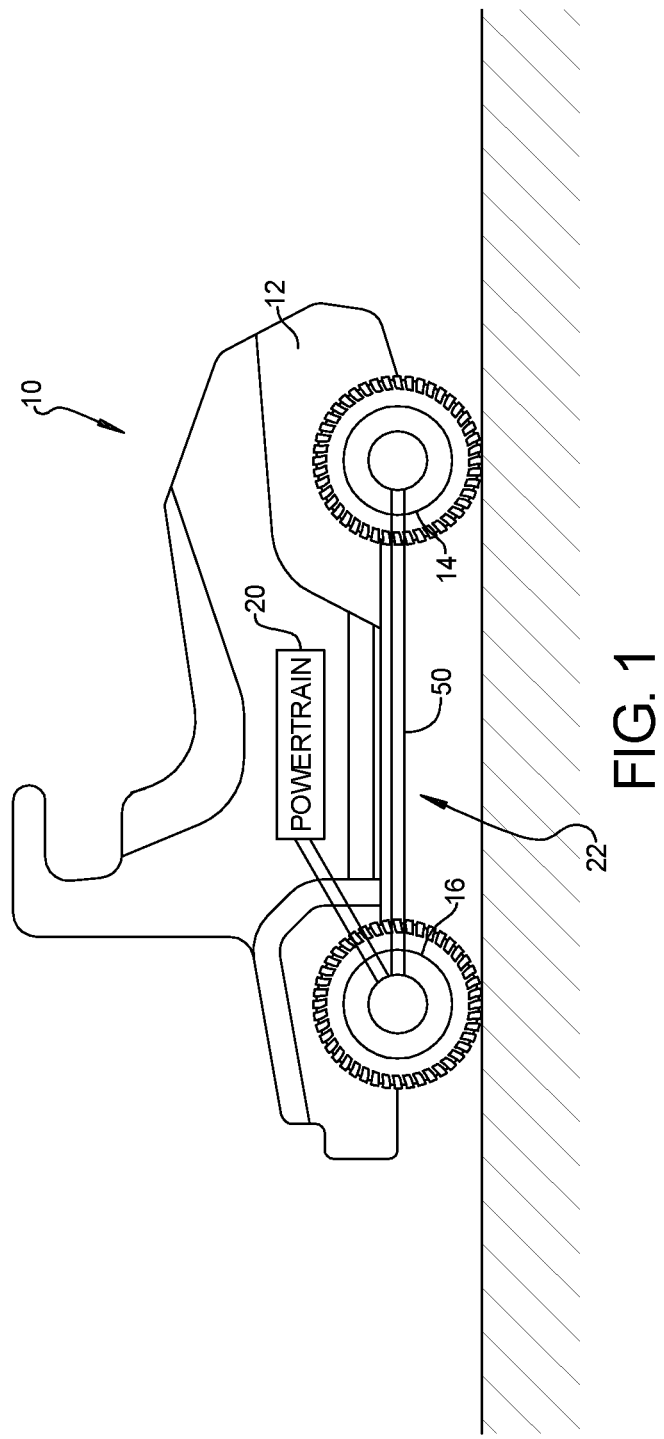
FIG. 1 is a side view of an off-road vehicle having a drive train formed according to the present disclosure.

Referring now to FIG. 1, an off-road vehicle 10 is illustrated. The off-road vehicle 10 includes a vehicle body 12 and pair of front wheels 14 and rear wheels 16. The wheels 14, 16 are coupled to the body through a suspension not shown. A powertrain 20 is coupled to the wheels 14, 16 through a drive assembly 22.

Figure 2:
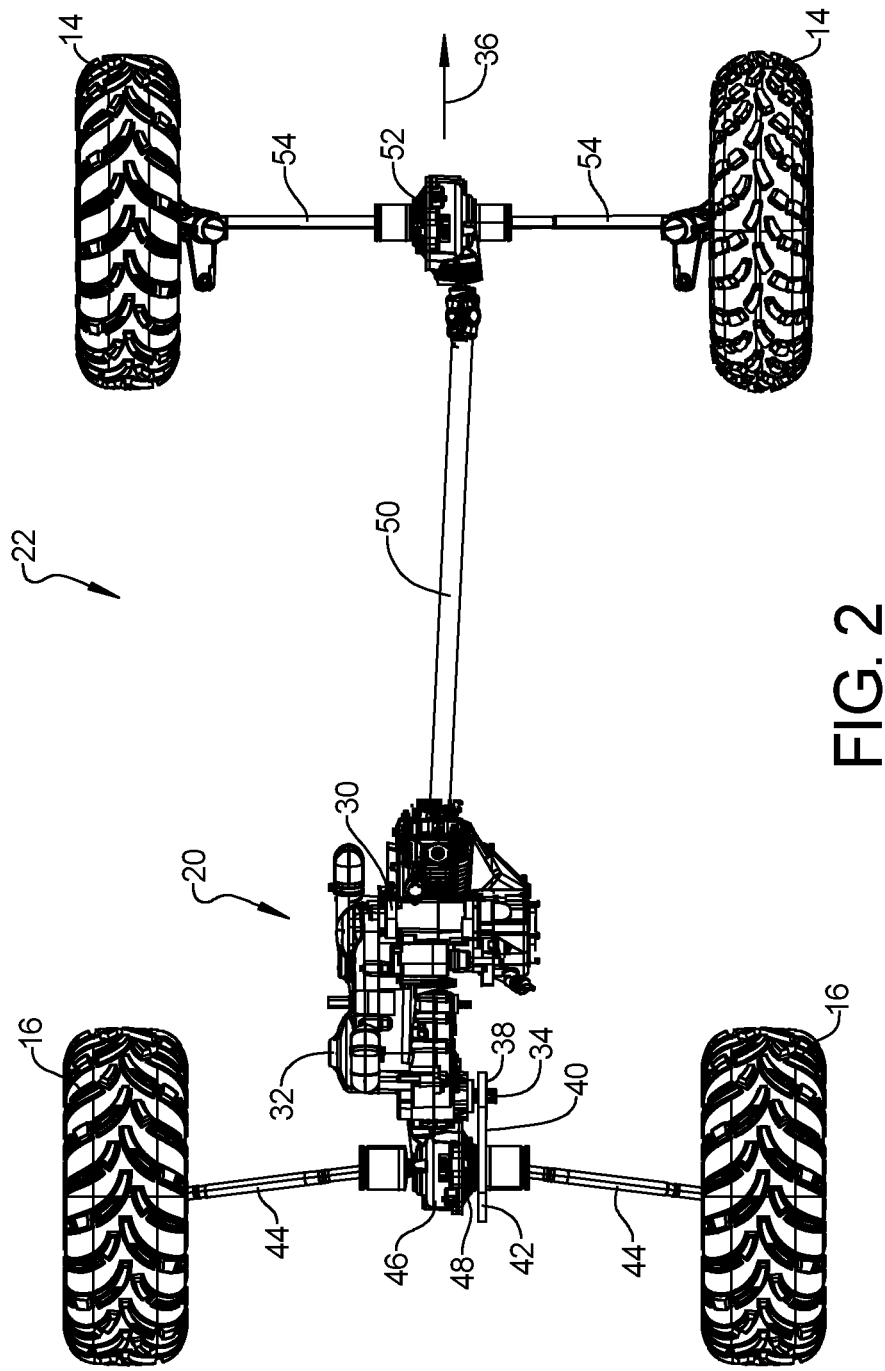
FIG. 2 is a top view of the powertrain relative to the drive train of FIG. 1.
Figure 3:
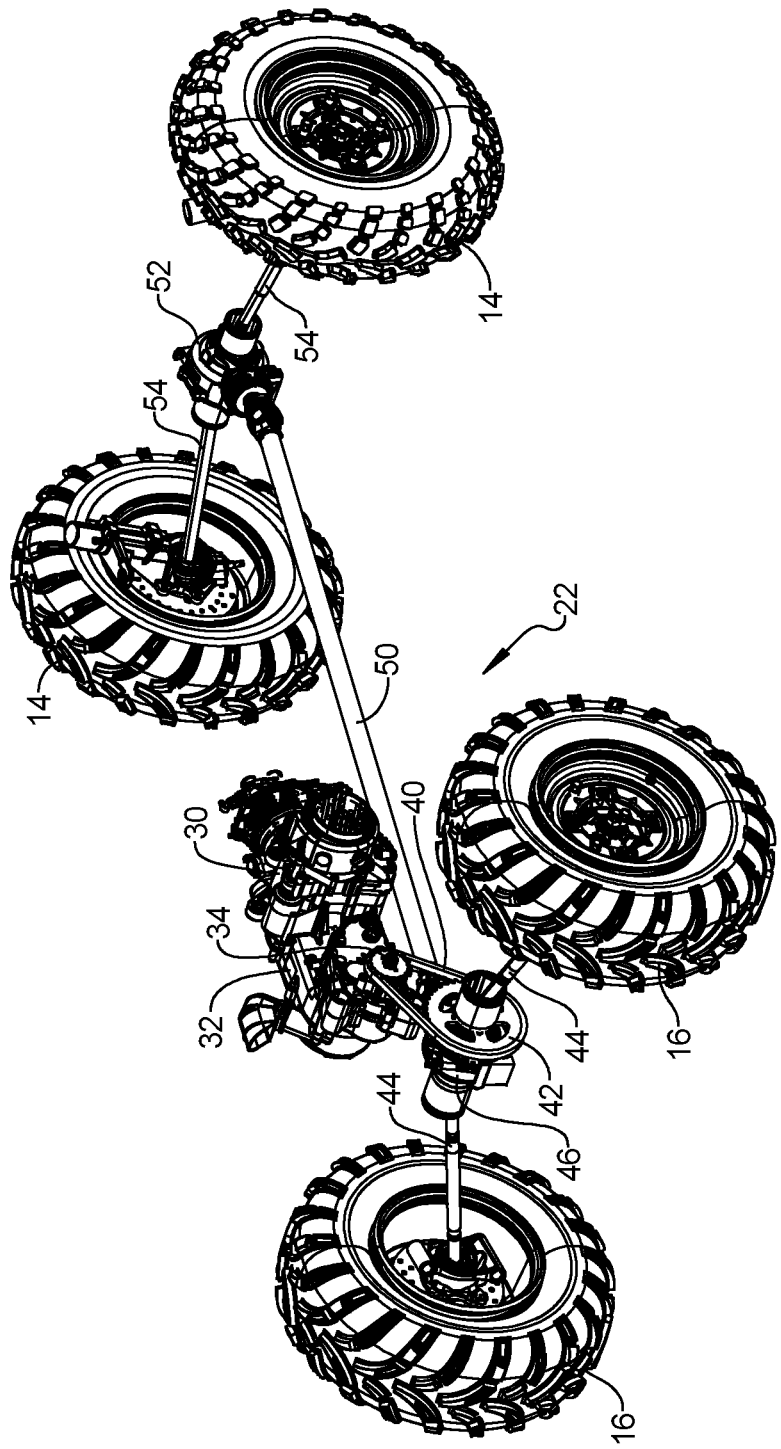
FIG. 3 is a perspective view of the powertrain and drive train of FIG. 2.
Figure 4:
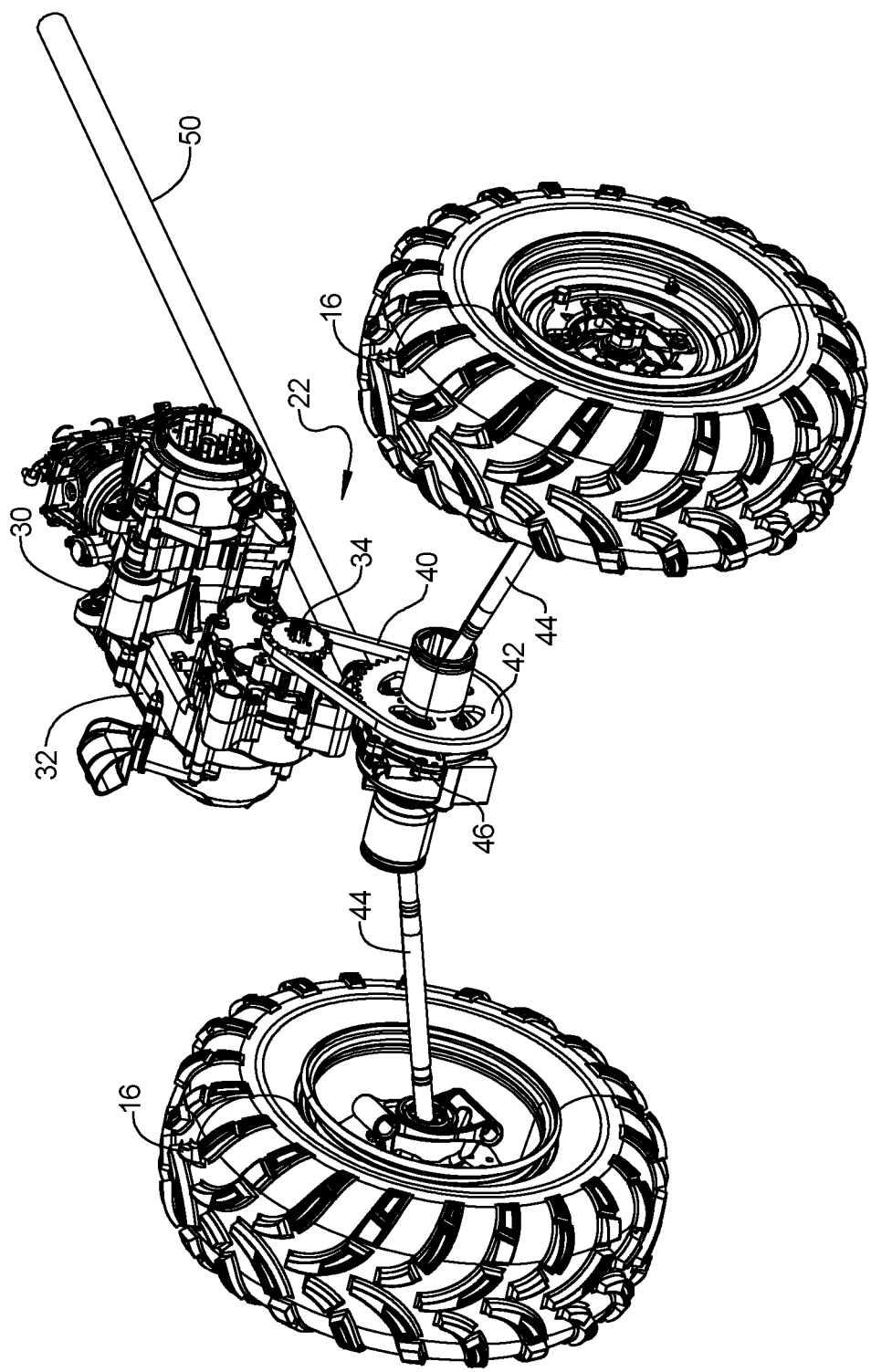
FIG. 4 is an enlarged perspective view of the drive train relative to the powertrain.

Referring now to FIGS. 2-4, the drive assembly 22 relative to the powertrain 20 is set forth in further detail. The powertrain 20 may include an engine 30 that is coupled to a transmission 32. The transmission 32 may be eliminated in some embodiments. The powertrain 20 has an output shaft 34 that rotates at an axis that may be perpendicular to the longitudinal axis 36 of the vehicle as illustrated. Of course, other orientations may be provided, The output shaft 34 may have a sprocket or pulley 38. A chain or belt 40 rotates with the output shaft 34 and the sprocket or pulley 38. The chain or belt 40 rotates a sprocket or pulley 42 that is ultimately used to couple the rear wheels 16 through half shafts 44. A rear coupler 46 such as a rear differential has a shaft that is common with the sprocket or pulley 42. The rear coupler 46 is coupled to a prop shaft 50. As the rear coupler 46 rotates, the prop shaft 50 rotates causing the internal sprockets or gears of a front coupler 52 such as a front differential to also rotate. The front coupler 52 rotates the front half shafts 54. The front coupler 52 and the rear coupler 46 may also include right angle drives and beveled sets of gears.

A sprocket or pulley is described as well as a chain or belt. Should a belt be used, pulleys will be used. When a chain is used, a sprocket is used at both the output shaft of the powertrain 20 and the sprocket or pulley 42 disposed in the drive assembly 22.

As is best illustrated in FIG. 2, the powertrain 20 and, in particular, the engine 30 and the transmission 32 are located directly above the prop shaft 50 in a vertical direction. This allows a space efficient configuration for the drivetrain.

In operation, the output shaft of the powertrain rotates. The output shaft has a sprocket or pulley associated therewith. As the sprocket or pulley rotates, the chain or belt 40 moves, causing the sprocket or pulley 42 to rotate the transaxle shaft 48. The transaxle shaft 48 causes the rear half shafts to rotate the rear wheels. The rear coupler 46 rotates with the transaxle shaft 48 and causes the prop shaft 50 to rotate. The rotating prop shaft 50 is coupled to the front coupler 52, which in turn rotates the front half shafts 54 and causes the front wheels to rotate. The wheels rotate on an axis that is different than the axis of the transaxle shaft 48 and therefore a double offset joint may be used to couple the transaxle shaft 48 to the wheels.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A drive system driving front wheels and rear wheels of a vehicle comprising:
    a powertrain comprising an output shaft, said output shaft comprising a first pulley or a first sprocket;
    a rear differential having a rear transaxle shaft coupled to the rear wheels through a pair of rear half shafts, said rear transaxle shaft having a second pulley or a second sprocket affixed thereto;
    a belt or a chain directly connecting the first pulley or first sprocket to the second pulley or the second sprocket;
    a pair of front half shafts coupled to the front wheels;
    a front coupler coupling the pair of front half shafts to a prop shaft; and
    the prop shaft disposed below the powertrain and directly coupling the rear differential to the front coupler.

2. The drive system of claim 1 wherein the powertrain comprises a transmission and the output shaft comprises a transmission shaft.

3. The drive system of claim 1 wherein the powertrain comprises an engine and a transmission and the output shaft comprises a transmission shaft.

4. The drive system of claim 1 wherein the powertrain comprises an engine and the output shaft comprises an engine shaft.

5. The drive system of claim 1 wherein the rear transaxle shaft is coupled to the output shaft through the chain, said chain is coupled to the output shaft through a sprocket.

6. The drive system of claim 1 wherein the rear transaxle shaft is coupled to the output shaft through the belt, said belt is coupled to the output shaft through a pulley.

7. The drive system of claim 1 wherein the rear differential comprises a beveled set of gears.

8. A method of driving front wheels and rear wheels of a vehicle comprising:
    rotating an output shaft of a powertrain;
    rotating a first pulley or first sprocket affixed to the output shaft;
    rotating a rear transaxle shaft of a rear differential through a second sprocket or a second pulley affixed to the rear transaxle by movement of a belt or chain coupling the first pulley or the first sprocket to the second pulley or the second sprocket;
    rotating a pair of rear half shafts by rotating the rear transaxle, said half shafts rotate the rear wheels coupled thereto;
    coupling a prop shaft directly between the rear differential and a front differential and rotating a pair of front half shafts; and
    rotating the front wheels by rotating the pair of front half shafts.

9. The method of claim 8 wherein rotating the rear transaxle shaft comprises coupling the output shaft to the rear transaxle shaft using a chain.

10. The method of claim 8 wherein rotating the rear transaxle shaft comprises coupling the output shaft to the rear transaxle shaft using a belt.

* * * * *